UNITED STATES PATENT OFFICE.

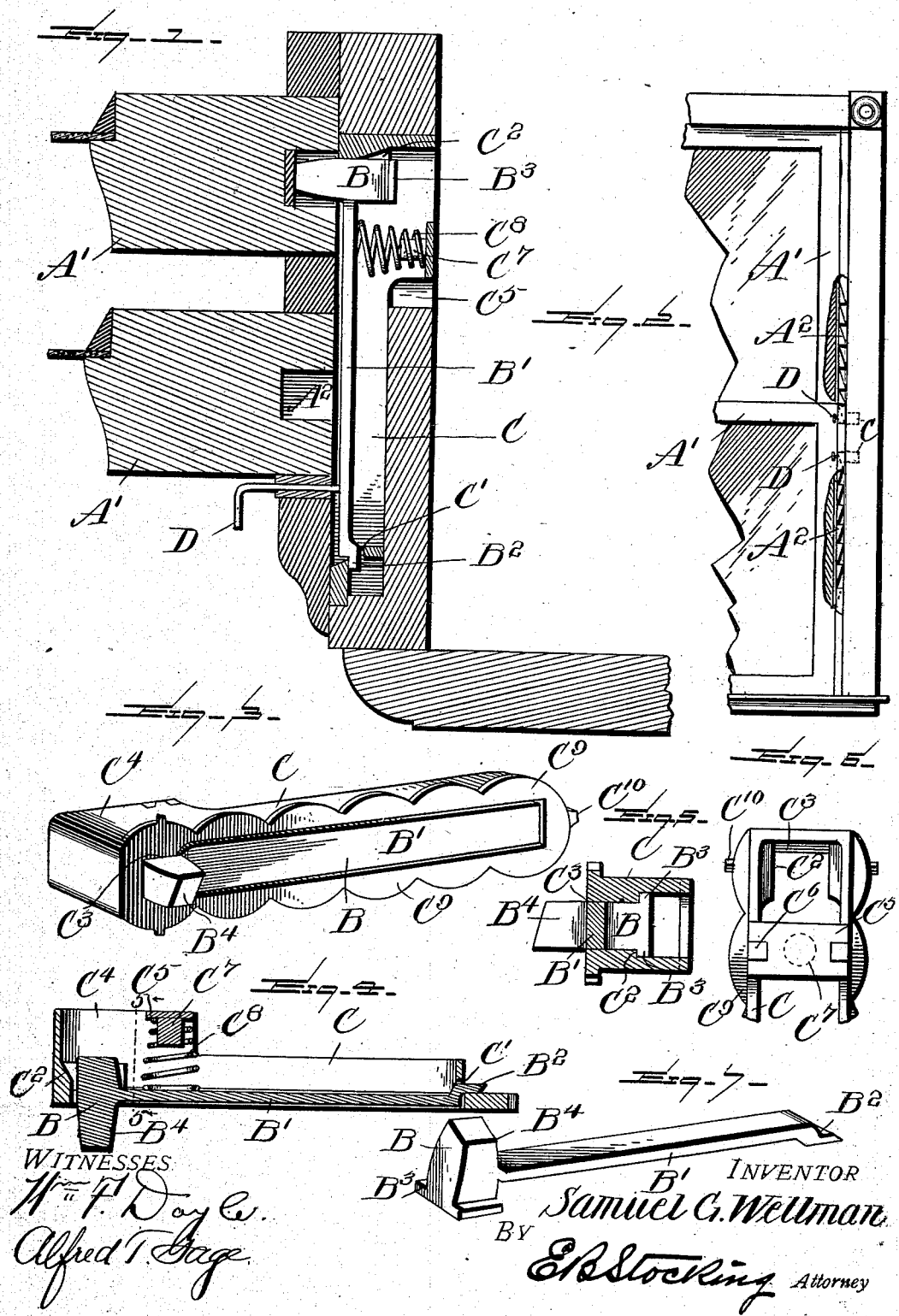

SAMUEL G. WELLMAN, OF CORRY, PENNSYLVANIA.

AUTOMATIC SASH-LOCK.

SPECIFICATION forming part of Letters Patent No. 714,343, dated November 25, 1902.

Application filed February 1, 1902. Serial No. 92,165. (No model.)

*To all whom it may concern:*

Be it known that I, SAMUEL G. WELLMAN, a citizen of the United States, residing at Corry, in the county of Erie, State of Pennsylvania, have invented certain new and useful Improvements in Automatic Sash-Locks, of which the following is a specification, reference being had therein to the accompanying drawings.

This invention relates to an automatic sash-lock, and particularly to a construction embodying a pivotally-mounted dog adapted to coöperate with a ratchet or rack upon the sash.

The invention has for an object to provide a very simple construction of casing provided with a pivoting-aperture, stop-flange, and spring-support for receiving and retaining a dog mounted therein, whereby a very simple and economical construction of lock is provided and one comprising the least number of parts for securing an efficient and positive operation.

Other and further objects and advantages of the invention will be hereinafter set forth, and the novel features thereof pointed out by the appended claims.

In the drawings, Figure 1 is a horizontal section through the window frame and sash, showing the application of the invention; Fig. 2, an elevation thereof, showing the disposition of the racks and parts broken away; Fig. 3, a detail perspective of the lock carried by the frame; Fig. 4, a longitudinal section of the lock; Fig. 5, a cross-section thereof on line 5 5 of Fig. 4; Fig. 6, a detail bottom plan of one end of the casing with the dog removed, and Fig. 7 is a detail perspective of the dog.

Like letters of reference refer to like parts in the several figures of the drawings.

The letter A designates a window-frame, which may be of any desired construction or configuration and provided with the usual sash A′, adapted to engage a dog B, located within the casing C. These racks are disposed in opposite directions, as shown in Fig. 2, and the dog and casing are disposed in a horizontal plane relative to the sash, one of the casings and dogs being of greater length than the other, so as to reach to the rear sash, and the shorter one coöperating with a rack upon the front sash.

The dog B is provided with a shank B′, extending rearwardly from its head, and a pivoting-lip B², adapted to enter a recess C′, formed at one end of the casing. The head of the dog is provided upon its under face or base with opposite flanges B³, adapted to engage the shoulders C², provided upon the interior of the casing, so as to limit the outward movement of the dog B. The face of this dog is inclined, as shown at B⁴, so as to ride over the teeth in one direction when disposed in a horizontal plane substantially at right angles to the teeth. The casing C is provided with a guide portion C³, adapted to retain the head of the dog against lateral movement, and this end of the casing is formed with walls C⁴, extended downward and provided with a bridge-plate C⁵, secured thereto in any desired manner—for instance, by upsetting the lug C⁶, extending from the casing C. This bridge-plate is provided with a post C⁷, adapted to receive a spring C⁸, which bears upon the under face of the shank B′ of the dog. The face-plate C⁹ of the casing C is formed of any desired configuration, but is preferably formed of a series of circles merged into each other, so that the casing will snugly fit into the recesses formed by an auger without the necessity for additional finishing-work when the casing is placed in condition for use. At suitable points upon the edge of this plate lugs C¹⁰ are provided, which are sharpened upon their under face, as shown in Fig. 5, so as to become embedded in the wood or material of the frame and retain the casing in position without the necessity of using any further securing devices.

From the foregoing construction it will be seen that the spring C⁸ constantly presses the dog B outward, so as to automatically cause the same to remain in contact with the face of the rack under normal conditions. When it is desired to remove the dog from contact with the rack, this can be readily effected by means of any suitable push device—such, for instance, as the pin D, pressing at its inner end against the shank B′ of the dog so as to retract the same from the rack. It will also be seen that the parts may be very simply assembled by inserting the dog from the rear of the casing, placing the lip B² in the pivoting-aperture C' of the casing, and then securing in position the bridge-plate C⁵, carrying the spring C⁸, by which the dog is held in place and under tension. It will also be seen that in case of the spring breaking the same can be readily removed from the post by compressing the spring and a new spring inserted in place without the necessity of removing the bridge-plate or placing a new lock in position. Owing to the simplicity of the construction of the lock the same can be very economically manufactured and sold and is adapted to be placed in position upon the frame of the window at a medium of labor and time.

It will be obvious that changes may be made in the details of construction and configuration without departing from the spirit of the invention as defined by the appended claims.

Having described my invention and set forth its merits, what I claim, and desire to secure by Letters Patent, is—

1. A sash-lock comprising a casing having a transverse pivoting-aperture at one end and a stop-shoulder at the opposite end, and a dog located therein provided with a lip deflected into a plane parallel with the body of the dog to enter said aperture and a lateral flange at the opposite end to engage said shoulder; substantially as specified.

2. A sash-lock comprising a casing having a pivoting-aperture at one end and a stop-shoulder at the opposite end, a dog located therein and provided with a lip to enter said aperture and a head portion having a flange to engage said shoulder, a bridge-plate separate from and secured to said casing adjacent to said head, and a tension-spring extending from said plate to said dog; substantially as specified.

3. In a sash-lock, an elongated open casing having at one end a lateral pivoting-slot and at its opposite end a guide portion provided with stop-shoulders upon opposite sides thereof, an elongated dog to fill the opening in said casing and having a deflected lip at one end to enter said pivoting-slot and a head to fit said guide portion provided at its base with opposite flanges to engage said shoulders, lugs extending from an extended wall upon the rear face of said casing at one end thereof, a separate bridge-plate disposed upon said face and secured by upsetting said lugs, a post carried by said bridge-plate, and a coiled spring surrounding said post and bearing against said dog; substantially as specified.

In testimony whereof I affix my signature in presence of two witnesses.

SAMUEL G. WELLMAN.

Witnesses:
D. E. LEACH,
BEN. F. STARR.